(12) United States Patent
Joffe et al.

(10) Patent No.: US 10,356,097 B2
(45) Date of Patent: *Jul. 16, 2019

(54) DOMAIN NAME SYSTEM AND METHOD OF OPERATING USING RESTRICTED CHANNELS

(71) Applicant: Neustar, Inc., Sterling, VA (US)

(72) Inventors: Rodney Lance Joffe, Tempe, AZ (US); David Link King, Cave Creek, AZ (US)

(73) Assignee: Neustar, Inc., Sterling, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,685

(22) Filed: Dec. 8, 2017

(65) Prior Publication Data

US 2018/0109527 A1 Apr. 19, 2018

Related U.S. Application Data

(63) Continuation of application No. 14/967,937, filed on Dec. 14, 2015, now Pat. No. 9,871,794.

(51) Int. Cl.
*H04L 29/06* (2006.01)
*H04L 29/12* (2006.01)

(52) U.S. Cl.
CPC .......... *H04L 63/10* (2013.01); *H04L 61/1511* (2013.01); *H04L 61/2007* (2013.01); *H04L 61/2061* (2013.01); *H04L 63/1416* (2013.01); *H04L 63/1433* (2013.01); *H04L 63/1458* (2013.01); *H04L 63/0428* (2013.01)

(58) Field of Classification Search
CPC .... H04L 63/10; H04L 63/1458; H04L 63/168
See application file for complete search history.

(56) References Cited

U.S. PATENT DOCUMENTS

| | | | |
|---|---|---|---|
| 7,620,733 B1 | 11/2009 | Tzakikario et al. | |
| 9,172,713 B2 | 10/2015 | Joffe et al. | |
| 9,648,004 B2 | 5/2017 | Joffe et al. | |
| 9,871,794 B2 * | 1/2018 | Joffe | H04L 61/1511 |
| 9,979,588 B1 * | 5/2018 | Benson | H04L 61/1511 |
| 2002/0009079 A1 * | 1/2002 | Jungck | H04L 29/12066 370/389 |
| 2003/0070096 A1 | 4/2003 | Pazi et al. | |
| 2006/0143458 A1 | 6/2006 | Tie et al. | |
| 2007/0253377 A1 | 11/2007 | Janneteau et al. | |
| 2008/0086574 A1 * | 4/2008 | Raciborski | H04L 29/12066 709/245 |
| 2012/0173760 A1 * | 7/2012 | Jog | H04L 61/1511 709/245 |
| 2012/0233657 A1 * | 9/2012 | Guevin | H04L 63/10 726/1 |

(Continued)

OTHER PUBLICATIONS

RFC 2535, "Domain Name System Security Extensions" Network Working Group, D. Eastlake, IBM, Mar. 1999, 47 pages.

*Primary Examiner* — David J Pearson
(74) *Attorney, Agent, or Firm* — Perkins Coie LLP

(57) ABSTRACT

A server system for a domain name system (DNS) which operates to concurrently provide both public-facing and restricted channels for receiving and handling Internet Protocol (IP) address requests from a population of computers. The server system implements an alternative DNS request handling process to provide a trusted computer entity with exclusive access to the restricted channels.

20 Claims, 4 Drawing Sheets

(56) References Cited

U.S. PATENT DOCUMENTS

2014/0282847 A1 9/2014 Blacka et al.
2016/0241509 A1* 8/2016 Akcin ..................... H04L 67/10
2017/0171206 A1 6/2017 Joffe et al.
2017/0339122 A1 11/2017 Joffe et al.

* cited by examiner

DOMAIN NAME SYSTEM AND METHOD OF OPERATING USING RESTRICTED CHANNELS

TECHNICAL FIELD

Examples described herein relate to a domain name system and method of operating using restricted channel resources.

BACKGROUND

In general terms, the Internet can be considered as a network of computers and information sources on which data networks such as the World Wide Web (WWW) run. Computers which operate on the data networks can communicate with each other, but to do so, the computers require an ability to address and locate one another, and further to identify the network property being sought. The Internet uses a combination of names and IP addresses in order to connect computers in accordance with a hierarchical organizational scheme. Domain names are typically assigned to network resources such as websites and servers. Such domain names are typically formatted in a manner which reflects the hierarchical organizational scheme, with extensions such as .COM or .ORG reflecting a top tier of the hierarchy. Each network resource which is assigned a domain name also has an Internet Protocol ("IP") address. When computers access a network resource with a domain name, the computers utilize the IP address to locate and access the network resource. The IP addresses, on the other hand, are typically assigned by authoritative entities, often in blocks, for distribution to network properties and resources which may already be associated with a name.

While IP addresses are numerical, the names allotted to network properties are frequently human-recognizable, and considerable motivation often exists to maintain the names of the network properties. However, the IP address of a network property is frequently changed for a variety of reasons, such as for purpose of security or network management. Under the naming scheme, when computers access a network property, a software component on the computer uses the name of the desired network property to obtain the IP address. The mechanism which a computer uses to determine the IP address associated with a particular name or network property is referred to as a domain name system ("DNS"). A DNS typically employs a service to translate a syntax of a request (e.g., user specifies domain name) of a requesting computer into a current IP address. The requesting computer can then access the requested network property using the current IP address.

The Internet has always served as a vehicle for malfeasance, in the form of hacking or online attacks. A relatively simple way to attack the online presence of a network entity or resource (e.g., movie studio releasing a movie title, website providing a service, etc.) is a denial of service (DOS) attack. In the DOS attack, requesting computers are operated (often without knowledge of the operator) to generate continuous and repeated requests for a same network property (or set of network properties). The DNS which handles the request may have its available channels consumed by the requests. If a sufficient quantity of requests can be generated, the DNS can be flooded, so that only a portion of the total requests can be serviced by the DNS. The number of genuine requests which can receive an IP address of a DNS under attack then drops, resulting in the network property or resource receiving significantly less traffic than it would otherwise receive.

DETAILED DESCRIPTION

Figure 1A:
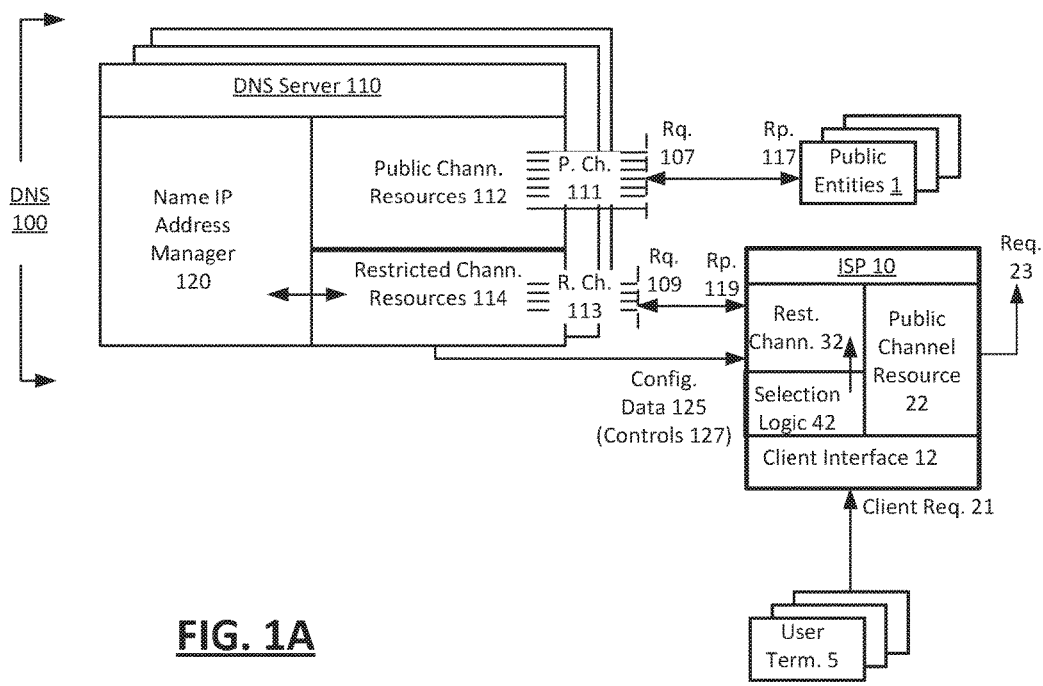
FIG. 1A illustrates an example domain name system, according to one or more embodiments.

Examples described herein include a server system for a domain name system (DNS) which operates to concurrently provide both public-facing and restricted channels for receiving and handling Internet Protocol (IP) address requests from a population of computers. The server system implements an alternative DNS request handling process to provide a trusted computer entity with exclusive access to the restricted channels.

According to some examples, a server system implements an alternative DNS request handling process by (i) establishing a set of restricted channels to receive and handle Internet Protocol (IP) address requests from a trusted computer entity, (ii) communicating configuration data to a trusted computer entity to enable the trusted computer entity to utilize one or more restricted channels of the restricted channel set, and (iii) receiving and handling IP address requests communicated by the trusted computer entity using the one or more restricted channels, while receiving and handling IP address requests from other computers of the population using the set of public-facing channels.

In examples provided, "restricted" in context of a channel or set of channels means the channel is only available for use to designated or selected entities (e.g., trusted entities). In contrast, a "public-facing" or public channel is indiscriminately available to a population of computers.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable mediums on which instructions for implementing some aspects can be carried and/or executed. In particular, the numerous machines shown in some examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, aspects may be implemented in the form of computer programs.

System Overview

FIG. 1A illustrates an example domain name system, according to one or more embodiments. An example domain name system ("DNS 100") of FIG. 1A implements functionality that recognizes an inherent vulnerability of DNS services to denial of service (DOS) attacks. Specifically, an example of FIG. 1A recognizes that a DNS service must be publicly available to a global population of computers when fielding requests for network properties managed through that DNS server. Given this role, DNS providers are generally vulnerable to DOS attacks, which seek to flood targeted DNS providers with requests that are sufficient in number to cause a conventional DNS provider to be unavailable for at least some requests. When DNS providers are unable to respond to all valid requests from the population of computers, the websites which are serviced by those providers lose traffic.

Moreover, when DNS providers are subjected to DOS attacks, the legitimate users of the population become frustrated by Internet congestion traffic. The percentage of valid requests which fail to receive a response from the DNS service can be based in part on the severity of the DOS attack. If an attacker can flood the DNS service with invalid requests, the number of legitimate requests which the DNS server can process can be significantly reduced, thereby reducing traffic to the network properties that are serviced by the particular DNS provider.

In an example of FIG. 1A, a domain name system ("DNS 100") includes a DNS server 110 which operates as part of hierarchical naming system to field requests to translate domain names identified through syntax into numerical IP addresses. The requests handled by the DNS server 110 can specify domain name syntax in a variety of formats, such as through a uniform resource locator (URL), addressed communication, or client request. While examples such as provided by FIG. 1A discuss the DNS 100 in terms of DNS server 110, the DNS 100 can include multiple DNS servers 110 that service different geographic or network regions, as well as provide alternative DNS functionality and/or redundancy.

DNS server 110 can communicate with a population of computing entities, such client terminals and servers for network services and networks. In an example of FIG. 1A, the DNS server 110 is shown to communicate with an Internet Service Provider ("ISP 10"). The ISP 10 is an example of a trusted entity for which the DNS 100 can establish, or make available restricted data channels and channel resources, for implementing an alternative DNS request handling process, as described below. Thus, examples described with FIG. 1A can be implemented with other computer entities, such as gateways for private networks, or even client machines.

In more detail, DNS 100 includes a DNS server 110, public-facing channel resources 112, restricted channel resources 114 and name and address logic 120. The public channel resources 112 can include physical (e.g., network ports) and logical resources to provide public-facing channels 111. In particular, the public-facing channels 111 can be implemented using public (or published) IP addresses, so as to be generally available to the population of computer entities without hindrance. Accordingly, as shown by an example of FIG. 1A, the DNS server 110 uses the public-facing channels 111 to field, without discernment, various IP address requests 107 from computing entities that utilize published IP addresses associated with the DNS 100.

The restricted channel resources 114 can include physical and logical resources to provide restricted channels 113. In at least some implementations, the restricted channel resources 114 can implement the restricted channels 113 using, for example, non-public (or unpublished) network addresses, which can be selectively shared with trusted entities such as represented by the ISP 10. Examples as described recognize ISPs as a class to be suitably trustworthy because ISPs typically have sufficient safeguards to detect and preclude events which can result in DOS attacks. For example, ISPs generally include safeguards to protect against serendipitous and malicious control of end user terminals in repeatedly requesting an IP address as part of an orchestrated event to flood a DNS server 110.

According to some examples, the DNS 100 selectively shares data ("configuration data 125") for enabling use of the restricted channels 113 to trusted entities such as ISP 10. Thus, the DNS 100 can control who receives configuration data 125 for accessing the restricted channels 113. Given the limited availability of the non-public IP addresses, the DNS 100 can provide a measure of security that ensures requests received over the restricted channels 113 are communicated from a trusted entity, and are therefore more likely to be legitimate requests (rather than requests generated under a DOS attack).

Accordingly, in an example of FIG. 1A, the DNS server 110 utilizes restricted channels 113 which are not published, but selectively shared with trusted entities. The DNS server 110 can use the restricted channels to field IP address requests 109 from designated entities such as represented by ISP 10. The IP address requests 107, 109 received over the respective public and restricted channels 111, 113 may be identical but for the channel of delivery. However, the entity that uses the restricted channels 113 may be guaranteed access to the DNS server 110, even when a DOS attack is underway.

In examples such as described with FIG. 1A, DNS server(s) 110 can implement logic, shown as the name and address manager 120, to provide responses 117 to IP address requests 107 received over the public-facing channels 111. The responses 117 can be communicated to the requesting entities 1 using the public-facing channels 111. The restricted channels 113 can also be used by the name and address manager 120 to provide responses 119 to IP address requests 109 received over the restricted channels 113. Thus, an example of FIG. 1A provides for the DNS server 110 to provide similar, if not identical services for requests received over the public-facing and restricted channels 111, 113.

According to some aspects, the DNS server 110 can communicate with ISP 10s, and further treat communications which originate from designated ISP 10s as trusted, at least to the extent that traffic forwarded by the ISP 10s are likely not part of an organized DOS attack. In particular, examples recognize that ISPs in general deploy security measures, such as network traffic monitors and/or throttling mechanisms, to guard against computers serviced by the ISP being used as drones for DOS attacks. For such relationships, some examples provide that the DNS 100 can provide the configuration data 125 to the ISP 10 (or other partner), and the ISP utilizes the configuration data 125 to communicate with the DNS server 110 using the restricted channels 113.

According to some examples, the ISP 10 includes a client interface 12, public channel resources 22 and restricted channel resources 32. The client interface 12 can field client requests 21 from a population of user terminals 5. The client requests 21 can specify syntax for websites or web properties. In response, the ISP 10 communicate with the DNS 100 (or other DNS service) in order to obtain the current IP address of the website or web property specified in the client request 21. According to some examples, the public channel resources 22 store publicly available IP addresses of DNSs in general, or alternatively, information for acquiring such addresses from other repositories or services. In some examples, the restricted channel resources 32 are provided or otherwise implemented through data obtained by the DNS 100. For example, the restricted channel resources 32 of the ISP 10 can be implemented using configuration data 125 communicated from the DNS server 110. In some examples, the restricted channel resources 32 include data which corresponds to, or otherwise identifies, the network addresses for the restricted channels 113 of the DNS server 110. Additionally, the restricted channel resources 32 can include programmatic or network mechanisms for facilitating the ISP 10 in communicating with the DNS 100.

According to some examples, the DNS 100 provides configuration data 125 to the ISP 10 that includes network address for the restricted channels 113. The ISP 10 can store the configuration data 125 (e.g., ISP data) and further receive updates from the DNS 100. In some examples, the configuration data 125 can provide a set of network addresses for locating the restricted channels 113 in an encrypted or secured data structure (e.g., table). As an addition or variation, the configuration data 125 provided from the DNS 100 can include security measures, such as functionality to encrypt the network addresses and/or data packets exchanged between the ISP 10 and the DNS server 110. Still further, in some examples, the communication data 125 include data for enabling the establishment of a virtual private network (VPN) or other encrypted channel.

In an example of FIG. 1A, the configuration data 125 enables the ISP to forward client requests 21 to the restricted channels 113 of the DNS server 110. In the event of an anticipated or actual DOS attach, for example, the DNS 100 can trust the ISP 10 to forward legitimate client requests 21 to the DNS server 110. The IP requests 109 from the ISP 10 can be handled using the restricted channels 113, without impact from a DOS attack which may hinder legitimate IP requests 107 that are communicated over the public-facing channels 111.

According to some examples, the ISP 10 can implement alternative modes or configurations for utilizing various DNS servers 110. Under a conventional mode or configuration, the ISP 10 receives requests 21 for network properties (e.g., websites) from client computers (e.g., end user devices) over the client interface 12, and uses public channel resources 22 in forwarding the request 23 to the DNS server which handles the particular web property specified in the client requests. For select requests 21, the ISP 10 can use the restricted channel resources 32 to implement an alternative mode (termed "alternative DNS request handling process") in which the ISP 10 forwards the client request 21 to the DNS server 110 using the restricted channels 113. As described by some examples, the restricted channel resource 32 may store or have access to a set of non-published network addresses that locate or link to the restricted channels 113 of the DNS server 110. In some variations, the restricted channel resources 32 which are resident on the ISP 10 can also include an encryption key or mechanism for implementing a cryptographic process with the DNS server 110 when communicating with the DNS server 110.

According to some aspects, the DNS 100 can have an established relationship with the ISP 10, by which the ISP 10 forwards all client requests 21 for properties of the DNS 100 using restricted channel resources 32. In some examples, the restricted channel resources 32 of the ISP 10 can include a data structure that stores a set of non-published IP addresses that identify the IP addresses of restricted channels 113 of the DNS 100.

In an example of FIG. 1A, the DNS server 110 can determine and communicate the configuration data 125 to the ISP 10. Thus, the source of the configuration data 125 is the DNS 100, rather than, for example, public resources. The configuration data 125 (e.g., set of restricted or unpublished IP addresses for the restricted channels 113) can be communicated from the DNS 100 to the ISP 10 using any one of multiple possible communication modes, such as an asynchronous communication mode (e.g., configuration data 125 is emailed to the ISP 10) and/or out-of-band communications, including encrypted or hashed communications. The ISP 10 can store or otherwise implement the configuration data 125 to establish restricted channel resources 32 for enabling communications with the DNS server 110 over the restricted channels 113. By establishing the restricted channel resources 32, the ISP 10 can implement an alternative DNS request handling process in which select client requests 21 for network properties of the DNS 100 are forwarded to the DNS server 110 using restricted or nonpublished resources that are resident or available to the ISP 10 and provided from DNS 100. In this manner, the ISP 10 forwards client requests 21 as IP address requests 109, using the restricted channels 113 of the DNS server 110.

According to some examples, the configuration data 125 can include a set of restrictions and/or controls 127 that can affect the implementation or use of restricted channel resources 32 on the ISP 10. More specifically, the set of restrictions and controls 127 can pertain to the set of non-published IP addresses which are used by the ISP 10 to identify the restricted channels 113. In one implementation, the set of restrictions and controls 127 can specify, for example, an expiration period and/or selection parameters which limits or otherwise controls the use or access to restricted channels 113 of the DNS server 110.

The DNS 100 can provide the restricted channels 113 for use with trusted parties on an as-needed or temporary basis. In such examples, when the DNS 100 makes the restricted channels 113 available, the ISP may implement an alternative DNS request handling procedure. As described with examples, the ISP 10 implements the alternative DNS request handling by forwarding client requests 21 for select network properties (specifically properties handled by the DNS 100) to the DNS server 110 using the restricted channel resources 32. The DNS server 110 receives the forwarded communication as address request 109 using the restricted channels 113. In some examples, all client requests 21 which are for the DNS 100 are forwarded to the DNS server 110 using the restricted channel resource 32.

As the ISP 10 implements its own safeguards and protective controls, the DNS server 110 can operate so that the restricted channels 113 are continuously available to the ISP 10, even when the public-facing channels 111 are flooded or under attack. Should demand for the restricted channels 113 grow, the DNS 100 can scale the number of restricted channels 113 which are available. According to some examples, the DNS 100 can prioritize use of the restricted resources 114 over those of the public-facing channel resources 112. For example, the DNS 100 can re-assign network ports to carry traffic for the restricted channels 113. The DNS server 110 can also acquire or provide for additional resources to accommodate traffic from, for example, a particular ISP 10. For example, the ISP 10 can be distributed geographically, and the DNS 100 can allocate the restricted channel resources 114 for different DNS servers 110 that communicate with individual ISP nodes at different geographic regions. The DNS 100 can selectively prioritize the restricted channels 113 over the public-facing channels 111, even when the volume of IP address requests 107 that are received over the public-facing channels 111 are substantially greater than the IP address requests 109 received over the restricted channels 113.

According to one aspect, the ISP 10 may pre-associate domain names or other syntax for websites and properties serviced by the DNS server 110 with the IP addresses for the restricted channels 113. In some variations, the ISP 10 includes selection logic 42, which can be in the form of, for example, a table, to determine when syntax appearing in individual client requests 21 are to be forwarded to the DNS 100. The selection logic 42 can trigger the ISP 10 to use the restricted channel resources 32 (e.g., non-public IP address, secure channel or VPN, etc.) in forwarding the client request 21 to the DNS 100. In variations, the restricted channel resources 32 are available for use at the control of the DNS 100. For example, the DNS 100 can specify when the restricted channels 113 are to be active and used by the ISP 10 and/or when the restricted channels 113 are to be discontinued. When the alternative DNS request handling process is in place, the ISP 10 can select to forward all client requests 21 that are to be served by the DNS 100 to the DNS server 110. Thus, for example, all traffic between the ISP 10 and the DNS 100 can shift from public facing channels 111 to the restricted channels 113.

In variations, when the alternative DNS request handling process is in place, the ISP 10 can utilize the selection logic 42 to add additional criteria as to which client requests 21 are forwarded to the DNS server 110 using the restricted channel resources 32, as opposed to the public channel resources 22. For example, the selection logic 42 can be configured to parse incoming requests for syntax of domain names, which when matched, result in the client request being forwarded to the DNS server 110 using a network address that is assigned to the restricted channels 113. Under such variations, when the client request 21 is not matched by, for example, domain name to additional criteria of the selection logic 42, the client request 21 is forwarded 23 using the public channel resources 22.

In some variations, client requests from the ISP 10 can be forwarded to the ISP using both restricted channels 113 and public-facing channels 111, with the determination of which channels to use being based on the domain name or term specified by individual client requests 21. In some implementations, the selection logic 42 can be configured with data of the DNS server 110 (e.g., configuration data 125), so that the selection logic 42 can determine whether to forward individual client requests 21 to the DNS server 110 using the public channels 111 or private channels 113.

Figure 1B:
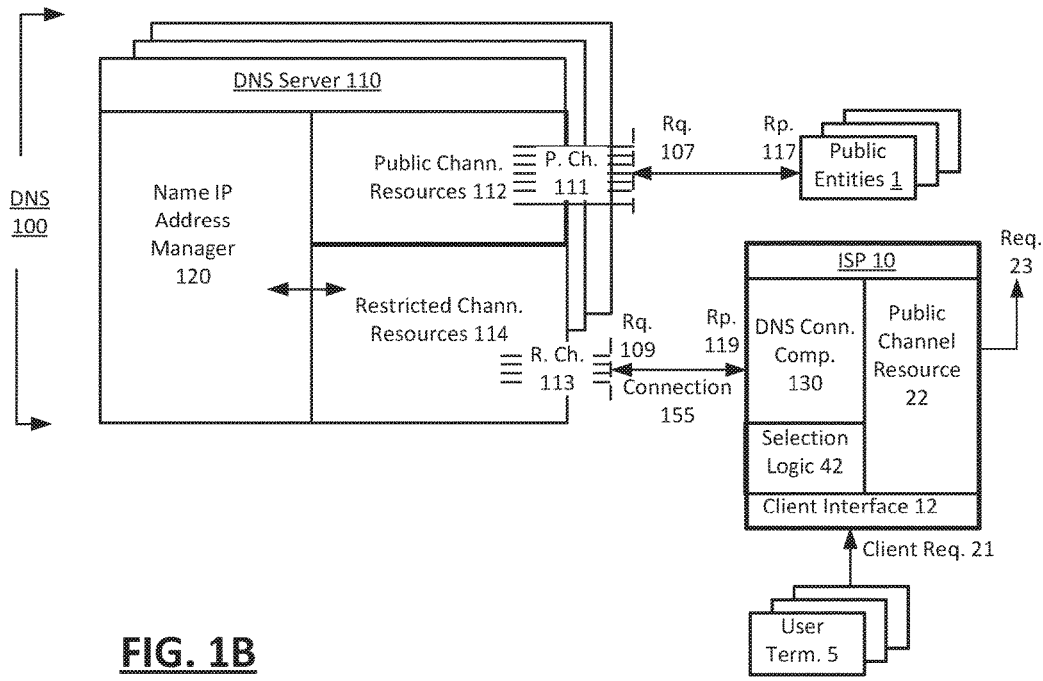
FIG. 1B illustrates an example DNS that enables an ISP to form a persistent point-to-point connection with a DNS server, according to one or more embodiments.

FIG. 1B illustrates a variation in which the DNS 100 enables the ISP 10 to form a persistent and point-to-point connection with the DNS server 110. In an example of FIG. 1B, the configuration data 125 provided from the DNS 100 enables the ISP 10 to establish and maintain a persistent point-to-point connection 155 (e.g., VPN connection) with the DNS server 110. In one implementation, the configuration data 125 includes instructions that can enable the ISP to install a DNS connection component 130. The configuration data 125 can be periodically updated from the DNS 100 to enable the DNS connection component 130 to maintain the persistent point-to-point connection 155 with the DNS server 110. The persistent point-to-point connection 155 can form the connection with the DNS server 110 over one or more restricted channels 113, so that the DNS server 110 uses restricted channel resources 114 to receive and handle IP address requests communicated over the persistent point-to-point connection 155.

According to some examples, for each incoming request 21 that meets criteria for forwarding to the DNS server 110, the ISP 10 forwards the communication to the DNS server 110 using the persistent point-to-point connection 155. The DNS connection component 130 can execute on the ISP 10 to maintain the persistent point-to-point connection 155. Should the DNS 100 determine to cease the alternative DNS request handling process, the DNS server 110 can signal configuration data 125 to trigger the DNS connection component 130 to terminate the DNS connection component 130. The ISP 10 may then use public channel resources 22 to forward client requests 21 for the DNS serer 110.

Figure 1C:
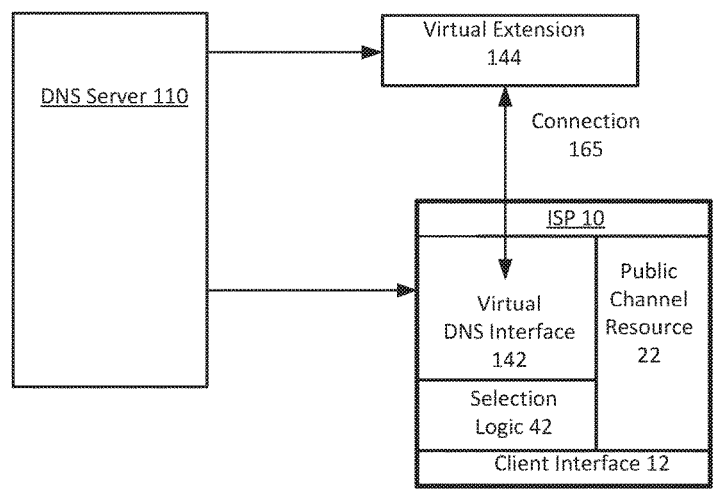
FIG. 1C illustrates an example DNS that enables an ISP to form a persistent point-to-point connection with a virtual extension of a DNS server, according to one or more embodiments.

FIG. 1C illustrates a variation in which the DNS 100 enables the ISP 10 to form a persistent point-to-point connection with a virtualized extension 144 of at least a portion of the DNS server 110, such as provided with the restricted channel resources 114. In an example of FIG. 1C, the DNS connection component 130 of FIG. 1B can be replaced or modified by virtual DNS interface 142, which resides with the ISP to establish a persistent point-to-point connection 165 with the virtualized extension of the DNS server 110. In practice, the virtualized extension 144 can include functionality that is replicated or otherwise extended so as to be accessible on a cloud or network based resource. The DNS 100 can provide configuration data 125 that includes instructions for implementing the virtual DNS interface 142 on the ISP 10.

When DNS 100 determines that an alternative DNS request handling process is to be implemented (e.g., at the initiation of a DOS attach), one example shown with FIG. 1C provides for the DNS 100 to generate the virtual (or cloud-based) instantiation of at least a portion of the DNS server 110 which includes restricted channel resources 114. This allows the DNS 100 to provide the virtual extension 144 by virtualizing least some restricted channel resources 114. The DNS 100 can then scale the virtualized restricted channel resources provided with the virtual extension 144 as needed. The virtual DNS interface 142 can reside with the ISP 10 to provide a persistent point-to-point connection 165 (e.g., VPN) to the virtualized extension 144 of the DNS server 110, enabling the DNS server 110 to handle the IP address requests of the ISP 10 using, for example, virtualized restricted channel resources.

With respect to examples of FIG. 1B and FIG. 1C, the persistent point-to-point connection 155, 165 can be configured within the ISP 10 to manifest as the shortest network connection to the DNS server 110. This ensures that the ISP 10 can maintain normal routing functionality and processes under, for example, the Border Gateway Protocol (BGP) when an alternative DNS request handling process is in place. Specifically, examples such as described recognize that the BGP protocol is typically in use by DNS and ISPs in general. The BGP protocol requires a forwarding entity to select a route to the destination that is the shortest network path available at the particular moment. The persistent point-to-point connection 155, 165 can be implemented to consistently manifest as a one hop connection to the DNS server 110, thus ensuring the ISP 10 and DNS server 110 can implement the BGP for IP address requests exchanged between the entities.

Methodology

Figure 2:
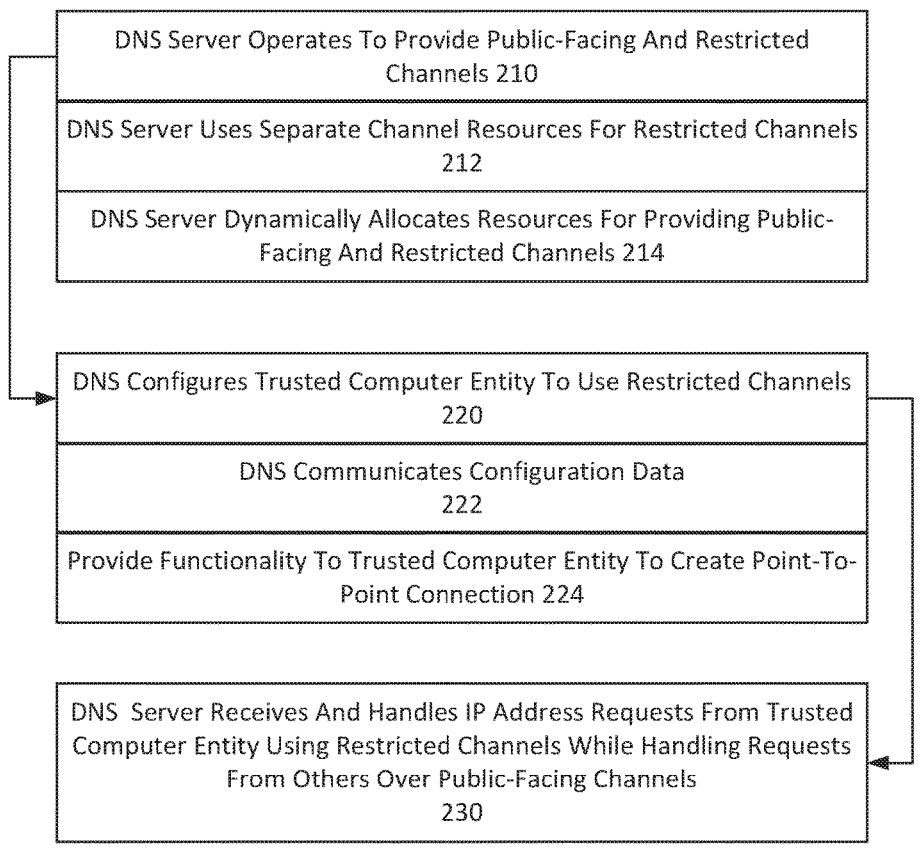
FIG. 2 illustrates an example method for enabling an alternative DNS request handling process.

FIG. 2 illustrates an example method for enabling an alternative DNS request handling process. A method such as described with an example of FIG. 2 may be implemented using a DNS such as described with FIG. 1A through FIG. 1C. Accordingly, reference may be made to elements of FIG. 1A through FIG. 1C for purpose of illustrating suitable components or elements for performing a step or sub-step being described.

According to some examples, the DNS server 110 operates to enable or otherwise provide public-facing channels 111 and restricted channels 113 (210) for receiving IP address requests for a given set of websites and/or properties. The DNS server 110 can operate in a default mode, in which requests communicated from computers of a given population or treated the same. In the default mode, the IP address requests can be received on public-facing channels 111, without use of restricted channels 113. The DNS 100 can elect to implement the alternative DNS request handling process when an event such as a DOS attack is underway. In such cases, the DNS 100 can use restricted channel resources 114 to provide restricted channels 113 for receiving and handling IP address requests. The restricted channel resources 114 can make the restricted channels 113 available for use by selected computer entities (e.g., ISP 10) when the alternative DNS request handling process is in place. As described by examples, the restricted channel resources 114 can provide for one or more multiple trusted computer entities to have substantially guaranteed access to the DNS server 110. In variations, separate sets of channel resources 114 (including corresponding channels 113) can be individually provided for each of multiple trusted computer entities.

In some examples, the DNS server 110 uses separate channel resources to implement each of the public-facing and restricted channels (212). The DNS server 110 can designate network ports exclusively for public or restricted channels. Logical resources for implementing public-facing and restrictive channels 111, 113 can also be partitioned.

Moreover, some examples provide that allocation of restricted channels 113, as well as public-facing channels 111, is dynamic (214). As a result, the volume of IP address requests which can be handled over the restricted channels 113 can be increased as needed to meet demand.

The restricted channel resources 114 can require additional steps or measures from the trusted computer entity that is outside of its default mode of operation. In order to enable the trusted computer entity to use the restricted channels 113 of the DNS server 110, the DNS 100 may configure the trusted computer entity (or trigger the trusted computer entity's configuration) so that the entity uses the restricted channels 113 when communicating IP address requests to the DNS server 110 (220). As described with examples of FIG. 1A through FIG. 1C, the DNS server 110 may communicate configuration data 125 (see FIG. 1A through FIG. 1C) to the trusted computer entity (222). By way of example, the configuration data 125 that is provided to the trusted computer entity can include one or more of restricted or non-published IP addresses for locating the restricted channels. As an addition or variation, the configuration data 125 can include encryption keys for enabling cryptographic communications over the restricted channels 113.

In some variations, the DNS server 110 configures the trusted computer entity by providing the trusted computer entity with functionality for creating a persistent point-to-point connection with the DNS server 110 (224). The persistent point-to-point connection 155 with the DNS server 110 can be implemented using, for example, a logical component (e.g., DNS connection component 130) that is resident on the trusted computer entity. In such examples, the DNS server 110 can provide configuration data 125 that includes instructions (e.g., a DNS application or program) and data (e.g., IP address for channel, encryption key) for enabling the trusted computer entity to establish the persistent point-to-point connection with the DNS server 110. Among other benefits, the use of the persistent point-to-point connection 155 enables the trusted computer entity to forward a relatively large volume of IP address requests to the DNS server 110 while conforming to existing protocols used for communicating IP address requests to DNS servers.

Still further, in some variations, the DNS server 110 provides the trusted computer entity with configuration data 125 for creating a persistent point-to-point connection with a virtualized extension of the DNS server 110. For example, as described with an example of FIG. 1C, the configuration data 125 can include instructions to enable the trusted computer entity to implement the virtual DNS connection interface 142, as well as data to enable the trusted computer entity to form the persistent point-to-point connection with a virtual extension of the DNS server 110. For example, as described with an example of FIG. 1C, the virtual DNS connection interface 142 can execute on the trusted computer entity using data, periodically updated by the DNS server 110, to establish the persistent point-to-point connection with the virtualized extension 144 of the DNS server 110.

Once the trusted computer entity is configured, the DNS server 110 can handle IP address requests from the trusted computer entity using restricted channel resources 114. In this way, the public-facing and restricted channel resources 112, 114 of the DNS server 110 are provided concurrently, each providing respective channels to receive and handle a corresponding volume of DNS requests for a given set of serviced network properties (e.g., websites) (230).

Computer System

Figure 3:
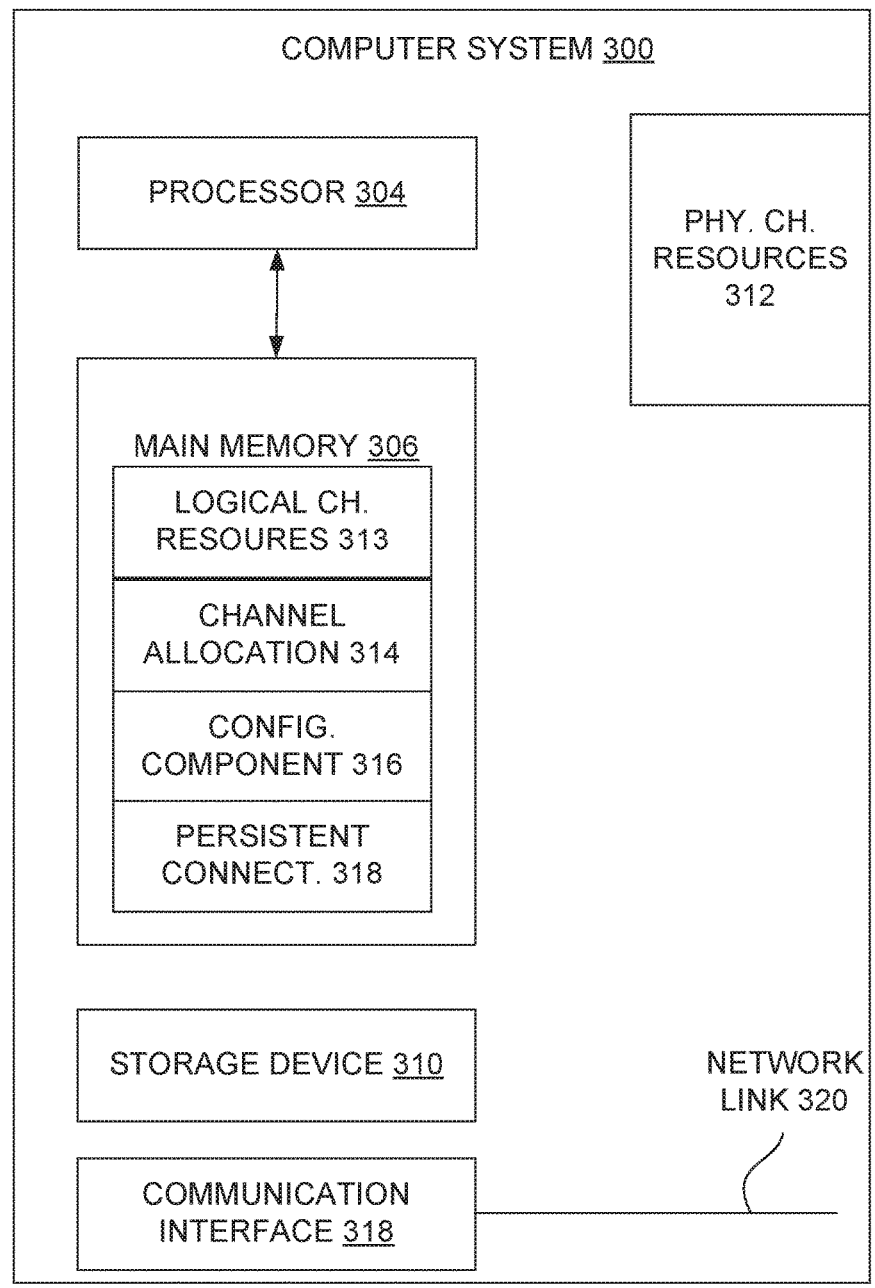
FIG. 3 is a block diagram that illustrates a computer system upon which an example DNS server can be implemented.

FIG. 3 is a block diagram that illustrates a computer system upon which an example DNS server can be implemented. For example, in the context of FIG. 1A through FIG. 1C, the DNS server 110 may be implemented using a computer system as shown and described by an example of FIG. 3. A computer system of FIG. 3 can also be used to implement a method such as described with an example of FIG. 2.

In an embodiment, computer system 300 includes processor 304, memory 306 (including non-transitory memory), storage device 310, and communication interface 318. Computer system 300 includes at least one processor 304 for processing information. Computer system 300 also includes the main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 may also include a read only memory (ROM) or other static storage device for storing static information and instructions for processor 304. The storage device 310, such as a magnetic disk or optical disk, is provided for storing information and instructions. The communication interface 318 may enable the computer system 300 to communicate with other servers or computer entities through use of the network link 320.

Examples described herein are related to the use of computer system 300 for implementing the techniques described herein. According to one embodiment, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative aspects, hard-wired circuitry may be used in place of or in combination with software instructions to implement aspects described herein. Thus, aspects described are not limited to any specific combination of hardware circuitry and software.

In some examples, the computer system 300 includes physical channel resources 312, logical channel resources 313, channel allocation logic 314 and configuration component 316. The channel resources 312 include network ports and associated logic for creating and maintaining channels to handle DNS requests from requesting computers. The channels provided through the channel resources 312 include public-facing channels 111 (see FIG. 1A-1C) and restricted channels 113 (see FIG. 1A-1C). The channel resources 312 can also include security mechanisms, such as for encrypting data and/or establishing restricted channels over a VPN with trusted computer entities. The channel allocation logic 314 can include logic for configuring available channels as either public-facing or restricted. In some examples, the channel allocation logic 314 can determine the allocation based on the available capacity of the restricted channels which are in use at that time. The configuration component 316 can generate configuration data 125 (see FIG. 1A-1C) to provide to a trusted computer entity (e.g., ISPs) in order to enable the trusted computer entity to use the restricted channels of the ISP 10.

In operation, the processor 304 can use the logical channel resources 313 to implement public-facing and restricted channels using physical channel resources 312 (e.g., network ports). The processor 304 can execute channel allocation logic 314 in changing an allocation of channels as between public-facing and restricted channels. In some examples, the channel allocation logic 304 can be used to make the changes in allocation of channels for exclusive use as restricted or public-facing, based on capacity and volume of IP address requests received over the restricted channels.

In variations, the computer system 300 can also include persistent connection functionality 318 for enabling a DNS connection component to be implemented on a trusted computer entity. The DNS connection component can include instructions, which when executed on the trusted computer entity, enable the computer entity to form the point-to-point connection 155 with the DNS server 110. In variations, persistent connection functionality 318 can enable the point-to-point connection 165 with a virtual extension of the DNS server 110 (e.g., see FIG. 1C).

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an embodiment, can be combined with other individually described features, or parts of other aspects. Thus, absence of describing combinations should not preclude the inventor(s) from claiming rights to such combinations.

What is claimed is:

1. A method for resolving domain name service (DNS) requests received from a plurality of channels, the method comprising:
   receiving, via a publicly-facing channel, a first DNS request from a first host device;
   generating a first response to the first DNS request based on a name and address manager;
   transmitting the first response to the first host device;
   receiving, via a restricted channel, a second DNS request from a second host device;
   generating a second response to the second DNS request based on the name and address manager; and
   transmitting the second response to the second host device,
   wherein, in response to a detection of a denial of service attack (DOS), the first host device transmits at least one of subsequent DNS requests via the restricted channel, and the method further comprises transmitting responses to the at least one of the subsequent DNS requests via the restricted channel.

2. The method of claim 1, further comprising: transmitting configuration data to the second host, and wherein the second host, based on the configuration data, configures itself to use the restricted channel to transmit DNS requests.

3. The method of claim 2, wherein the second host is an entity trusted by the DNS.

4. The method of claim 2, wherein the configuration data includes an encryption key that is used by the second host communicate requests using the restricted channel.

5. The method of claim 2, wherein the configuration data is used by the second host to create a persistent point-to-point connection with the DNS using the restricted channel.

6. The method of claim 1, further comprising dynamically allocating resources to increase or decrease a capacity of the DNS to handle requests from the restricted channel.

7. The method of claim 6, wherein dynamically allocating resources includes reallocating resources of the DNS server system to handle requests from the public-facing channel towards increasing the capacity to handle requests from the restricted channel.

8. The method of claim 1, wherein the public channel and the restricted channel each include a set of network ports that are designated for the respective channel.

9. The method of claim 1, further comprising receiving, via the restricted channel, the first DNS request from the first host device, wherein the first response is transmitted to the first host device via the restricted channel, and wherein the first host device transmits the first DNS request via the restricted channel in response to a detection of a denial of service (DOS) attack.

10. The method of claim 1, wherein the second host is a server associated with an Internet Service Provider.

11. A server for resolving domain name service (DNS) requests received from a plurality of channels, the server comprising:
a memory to store a set of instructions;
one or more processors configured to:
receive, via a publicly-facing channel, a first DNS request from a first host device;
generate a first response to the first DNS request based on a name and address manager;
transmit the first response to the first host device;
receive, via a restricted channel, a second DNS request from a second host device;
generate a second response to the second DNS request based on the name and address manager; and
transmit the second response to the second host device,
wherein, in response to a detection of a denial of service attack (DOS), the first host device transmits at least one of subsequent DNS requests via the restricted channel, and the one or more processors are further configured to transmit responses to the at least one of the subsequent DNS requests via the restricted channel.

12. The server of claim 11, further comprising: transmitting configuration data to the second host, and wherein the second host, based on the configuration data, configures itself to use the restricted channel to transmit DNS requests.

13. The server of claim 12, wherein the second host is an entity trusted by the DNS.

14. The server of claim 12, wherein the configuration data includes an encryption key that is used by the second host to communicate requests using the restricted channel.

15. The server of claim 12, wherein the configuration data is used by the second host to create a persistent point-to-point connection with the DNS using the restricted channel.

16. The server of claim 11, further comprising dynamically allocating resources to increase or decrease a capacity of the DNS to handle requests from the restricted channel.

17. The server of claim 11, wherein the public channel and the restricted channel each include a set of network ports that are designated for the respective channel.

18. The server of claim 11, further comprising receiving, via the restricted channel, the first DNS request from the first host device, wherein the first response is transmitted to the first host device via the restricted channel, and wherein the first host device transmits the first DNS request via the restricted channel in response to a detection of a denial of service (DOS) attack.

19. The server of claim 11, wherein the second host is a server associated with an Internet Service Provider.

20. A non-transitory computer-readable medium to store instructions that, when executed by one or more processors of a server for resolving domain name service (DNS) requests received from a plurality of channels, cause the computer system to perform operations that include:
receiving, via a publicly-facing channel, a first DNS request from a first host device;
generating a first response to the first DNS request based on a name and address manager;
transmitting the first response to the first host device;
receiving, via a restricted channel, a second DNS request from a second host device;
generating a second response to the second DNS request based on the name and address manager; and
transmitting the second response to the second host device,
wherein, in response to a detection of a denial of service attack (DOS), the first host device transmits at least one of subsequent DNS requests via the restricted channel, and the operations further include transmitting responses to the at least one of the subsequent DNS requests via the restricted channel.

* * * * *